United States Patent
Raymond et al.

(10) Patent No.: US 8,858,330 B2
(45) Date of Patent: Oct. 14, 2014

(54) MUSIC VIDEO GAME WITH VIRTUAL DRUMS

(75) Inventors: Jesse B. Raymond, Rensselaer, NY (US); Muhammad A. Ahmed, East Greenbush, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 1440 days.

(21) Appl. No.: 12/172,932

(22) Filed: Jul. 14, 2008

(65) Prior Publication Data

US 2010/0009746 A1     Jan. 14, 2010

(51) Int. Cl.
*A63F 9/24* (2006.01)
*A63F 13/00* (2014.01)
*A63F 13/40* (2014.01)

(52) U.S. Cl.
CPC ......... *A63F 13/10* (2013.01); *A63F 2300/8047* (2013.01); *A63F 2300/1062* (2013.01); *A63F 2300/1006* (2013.01); *A63F 2300/105* (2013.01); *A63F 2300/6045* (2013.01); *A63F 2300/6081* (2013.01); *A63F 2300/1018* (2013.01)
USPC ................................ 463/35; 463/36; 463/37

(58) Field of Classification Search
CPC . A63F 13/06; A63F 13/005; A63F 2300/105; A63F 2300/1062; A63F 2300/8047
USPC .......................................................... 463/35
See application file for complete search history.

(56) References Cited

U.S. PATENT DOCUMENTS

| | | |
|---|---|---|
| 4,326,441 A * | 4/1982 | Imamura et al. ........... 84/635 |
| 4,429,880 A | 2/1984 | Chen et al. |
| 4,445,376 A | 5/1984 | Merhav |
| 4,524,348 A | 6/1985 | Lefkowitz |
| 4,787,051 A | 11/1988 | Olson |
| 4,839,838 A | 6/1989 | LaBiche et al. |
| 5,128,671 A | 7/1992 | Thomas, Jr. |
| 5,140,889 A | 8/1992 | Segan et al. |
| 5,181,181 A | 1/1993 | Glynn |
| 5,223,655 A | 6/1993 | Watanabe et al. |
| 5,363,120 A | 11/1994 | Drumm |
| 5,438,529 A | 8/1995 | Rosenberg et al. |
| 5,516,105 A | 5/1996 | Eisenbrey et al. |
| 5,598,187 A | 1/1997 | Ide et al. |
| 5,615,132 A | 3/1997 | Horton et al. |
| 5,739,457 A | 4/1998 | Devecka |
| 5,806,849 A | 9/1998 | Rutkowski |
| 5,819,206 A | 10/1998 | Horton et al. |
| 5,898,421 A | 4/1999 | Quinn |
| 5,920,024 A | 7/1999 | Moore |

(Continued)

OTHER PUBLICATIONS

"Wii", Operations Manual System Setup, Nintendo of America Inc., 20 pgs.

*Primary Examiner* — Steven J Hylinski
(74) *Attorney, Agent, or Firm* — Klein, O'Neill & Singh, LLP

(57) ABSTRACT

A video game maps each of a plurality of outputs to inputs associated with a video game controller. In some embodiments, the plurality of outputs represent the various potential outputs of a drum set. Combinations of video game controller inputs are used to generate the outputs. Video game controller inputs include traditional input devices such as button inputs, as well as input signals generated from positioning and movement of the video game controllers. In some embodiments, a video game console provides a video representation of the outputs generated by input combinations received from the video game controllers.

5 Claims, 13 Drawing Sheets

(56) References Cited

U.S. PATENT DOCUMENTS

| | | | |
|---|---|---|---|
| 6,018,121 | A | 1/2000 | Devecka |
| 6,249,274 | B1 | 6/2001 | Svancarek et al. |
| 6,268,557 | B1 | 7/2001 | Devecka |
| 6,342,665 | B1 | 1/2002 | Okita et al. |
| 6,369,313 | B2 | 4/2002 | Devecka |
| 6,388,183 | B1 | 5/2002 | Leh |
| 6,390,923 | B1 * | 5/2002 | Yoshitomi et al. ............... 463/43 |
| 6,426,741 | B1 | 7/2002 | Goldsmith et al. |
| 6,555,737 | B2 * | 4/2003 | Miyaki et al. ............... 84/477 R |
| 6,645,067 | B1 | 11/2003 | Okita et al. |
| 6,835,887 | B2 | 12/2004 | Devecka |
| 6,921,332 | B2 | 7/2005 | Fukunaga et al. |
| 7,135,637 | B2 | 11/2006 | Nishitani et al. |
| 7,179,984 | B2 | 2/2007 | Nishitani et al. |
| 7,183,480 | B2 | 2/2007 | Nishitani et al. |
| 7,320,643 | B1 | 1/2008 | Brosius et al. |
| 7,351,148 | B1 | 4/2008 | Rothschild et al. |
| 7,459,624 | B2 * | 12/2008 | Schmidt et al. ............. 84/477 R |
| 7,625,284 | B2 * | 12/2009 | Kay et al. ........................ 463/31 |
| 2006/0058101 | A1 * | 3/2006 | Rigopulos ....................... 463/35 |
| 2006/0107819 | A1 * | 5/2006 | Salter .......................... 84/470 R |
| 2007/0270217 | A1 * | 11/2007 | Rabin ............................. 463/37 |
| 2008/0220864 | A1 * | 9/2008 | Brosius et al. .................. 463/33 |
| 2008/0280680 | A1 * | 11/2008 | Dutilly et al. .................. 463/36 |
| 2010/0009750 | A1 * | 1/2010 | Egozy et al. .................... 463/35 |

\* cited by examiner

MUSIC VIDEO GAME WITH VIRTUAL DRUMS

BACKGROUND OF THE INVENTION

The present invention relates generally to video games, and more particularly to a music rhythm video game with audio and video outputs mapped to, and generated from, video game controller input combinations.

Becoming proficient at a musical instrument may be very time consuming and daunting. Music related video games provide enjoyment to many people by allowing players to simulate play of a musical instrument in a video game environment, even when mastery of the real musical instrument may be out of the question. While playing music related video games with simulated musical instruments may not require the same skill set as playing their real musical instrument counterparts, the simulated musical instruments may offer their own unique challenges. Instructions may be presented on a visual display. Players generally operate video game controllers associated with the particular video game in response to the displayed instructions.

Many instruments, for example, complete drum sets, are difficult to simulate using conventional video game controllers generally associated with video game systems currently on the market. Drum sets include a wide array of different drum components, which in many instances, greatly outnumber the number of available input sources on a typical video game controller. Furthermore, it may be difficult to keep track of all the different drum components.

SUMMARY OF THE INVENTION

In one aspect the invention provides a method of providing audio and video outputs for a video game, comprising receiving an input signal from a video game controller; receiving additional signals from a plurality of additional inputs on the video game controller; selecting an audio output to output based on the input signal and the additional signals; and determining a video output based on the selected audio output.

In another aspect the invention provides a method of generating a drum output in a music video game, comprising receiving a first input signal from a set of video game controllers; determining output modification parameters on the first input signal; receiving a second input signal from the set of video game controllers; and selecting a drum output from a plurality of drum outputs for the second input signal based on the modification parameters.

In another aspect the invention provides system for providing a visual interface for identifying audio outputs generated on a simulated drum set in a video game, comprising a display; a set of video game controllers; memory, the memory including modifying parameters associated with a plurality of additional inputs on at least one of the set of video game controllers and a mapping of video output signals to audio output signals; and a processor configured by program instructions to generate display information of the visual interface, the program instructions including instructions for: receiving an input signal from the set of video game controllers; detecting additional inputs activated at the time the input signal is received; processing the input signal to generate an audio output signal based on the activated additional inputs; and displaying the video output signal mapped to the generated audio output signal on the visual interface.

In another aspect the invention provides a music based video game system, comprising a first video game controller including a first plurality of inputs and a first accelerometer; and a second video game controller including a second plurality of inputs and a second accelerometer, the second video game controller configured to communicate with the first video game controller; the first video game controllers and the second video game controller configured to generate input signals, the input signals including generation signals, each generation signal mapped to a one of a plurality of output signals in the music based video game, and modification signals; and a processing unit, wherein the processing unit configured to receive the generation signals and modification signals and determine output signals to generate based on the generation signals and modification signals, each of the output signals simulating a drum of a drum set.

In yet another aspect the invention provides a music based video game including audio generation based on input signals received from a plurality of input devices on a video game controller, wherein the music based video game including a plurality of modes, the plurality of modes comprising a default mode wherein audio outputs are generated based on input signals received from the plurality of input devices; and a fill mode including a prerecorded string of audio outputs, wherein each audio output of the prerecorded string of audio outputs is generated sequentially, a one audio output generated when a preselected input signal is received.

These and other aspects of the invention are more fully comprehended upon review of this disclosure.

DETAILED DESCRIPTION

Figure 1:
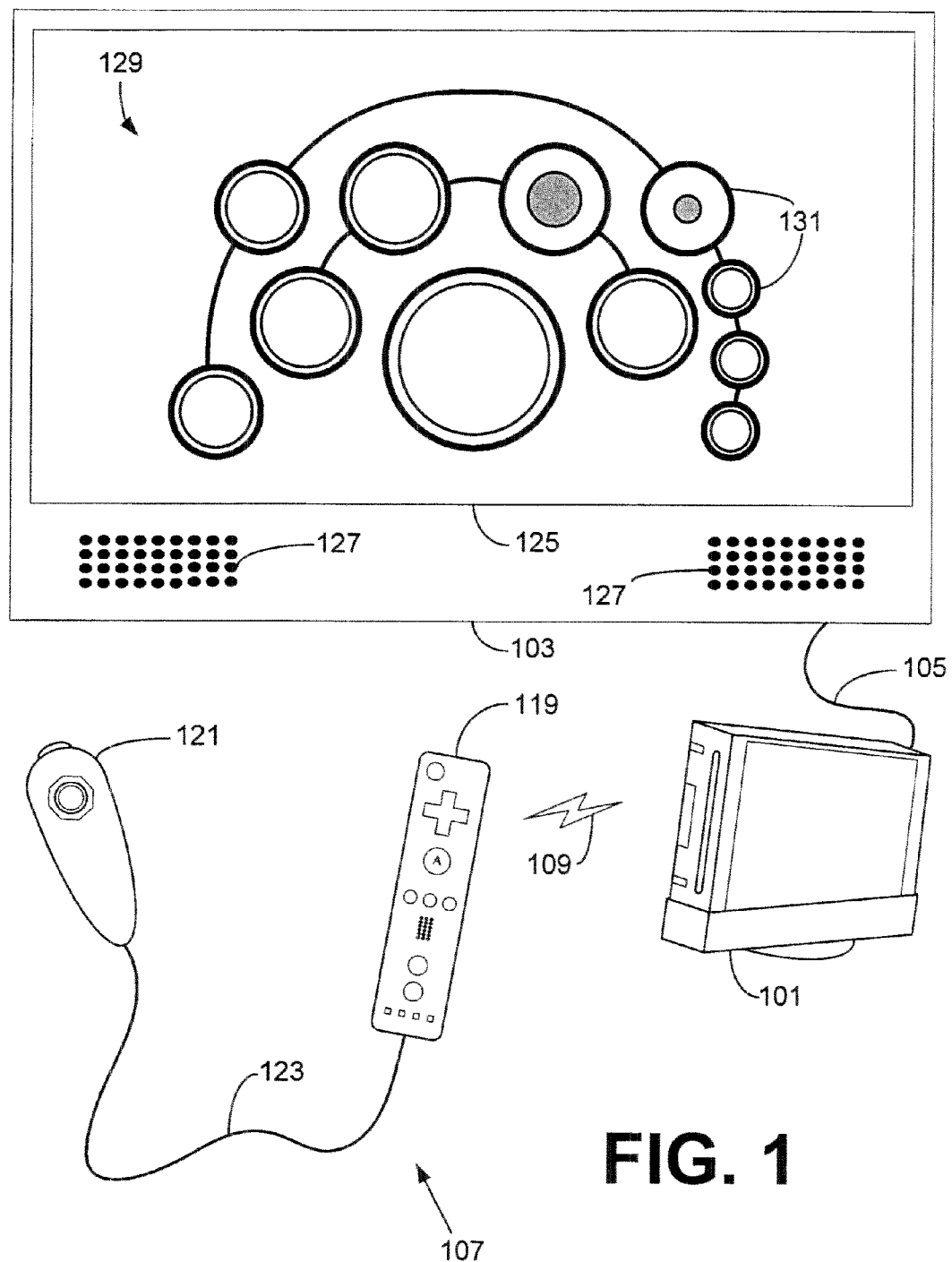
FIG. 1 is an example of a video game system in accordance with aspects of the invention.

FIG. 1 illustrates an example of a video game system in accordance with aspects of the invention. The video game system includes a video game console 101. The video game console is connected to a display unit 103 via an audio-video cable 105. The video game console is also in data communication with a set of video game controllers 107. In FIG. 1, the video game console is in data communication with the set of video game controllers through a wireless connection 109. In various embodiments, the data communication may instead be by way of a wired connection. The video game console includes circuitry for performing video game related functions, for example, circuitry including a processor and memory. The video game console also includes interface circuitry, for example, interface circuitry for receiving an external memory source holding video game instructions, and interface circuitry for facilitating communication with the set of video game controllers.

In FIG. 1, the video game console is processing instructions for a music rhythm game. The video game console receives signals from the set of video game controllers, which as illustrated include a primary video game controller 119 and a secondary video game controller 121, with the secondary video game controller communicating with the primary video game controller through a connection cable 123. The primary video game controller and the secondary video game controller are generally operated by a user, with the video game controllers generating input signals for the video game controller in accordance with operation by the user.

In the embodiment illustrated in FIG. 1, the video game console may be a Nintendo Wii, with the set of video game controllers including a Wii Remote and a Nunchuk controller. In various other embodiments the invention may be practiced with other video game consoles and compatible video game controllers.

In FIG. 1, the display unit is a television including a display screen 125 and a set of audio speakers 127, although other display units may be used, as well as external audio speakers. The display screen shows a screen shot of a visual user interface 129 in an embodiment of the invention. The user interface represents different drums of a virtual drum set, with a plurality of circular icons, for example, icons 131, each icon associated with a different drum or drum sound. Different drum sounds are generated, and, for example, their associated circular icons change color, based on processing of various input signals from the set of video game controllers.

In the music rhythm game embodiment of FIG. 1, input signals are generated by the set of video game controllers. In certain embodiments, the input signals may represent input button depressions, acceleration of or gravitational forces acting on the controllers, or positional changes of or directional gestures made with the video game controller. The input signals are provided to the video game console, the video game console processing the input signals and determining outputs associated with a combination of input signals, the outputs for example including an audio output and a corresponding visual output on the user interface. The determination may be based on video game instructions for a particular video game executing on the video game console.

In some embodiments the video game console determines a particular audio output and corresponding visual output based on an input signal from a controller indicative of motion of the controller in a predefined manner, the identity of the controller, and status of input signals associated with buttons of the controller. In some embodiments the video game console, in addition to or instead of utilizing status of input signals associated with buttons of the controller, determines the particular audio output and corresponding visual output based on direction of movement or relative location of the controller. In embodiments of the invention, the audio outputs are drum sounds, but in other embodiments, the generated outputs may be of other musical instruments, or for other applications, may be generated based on the video game being played.

Figure 2:
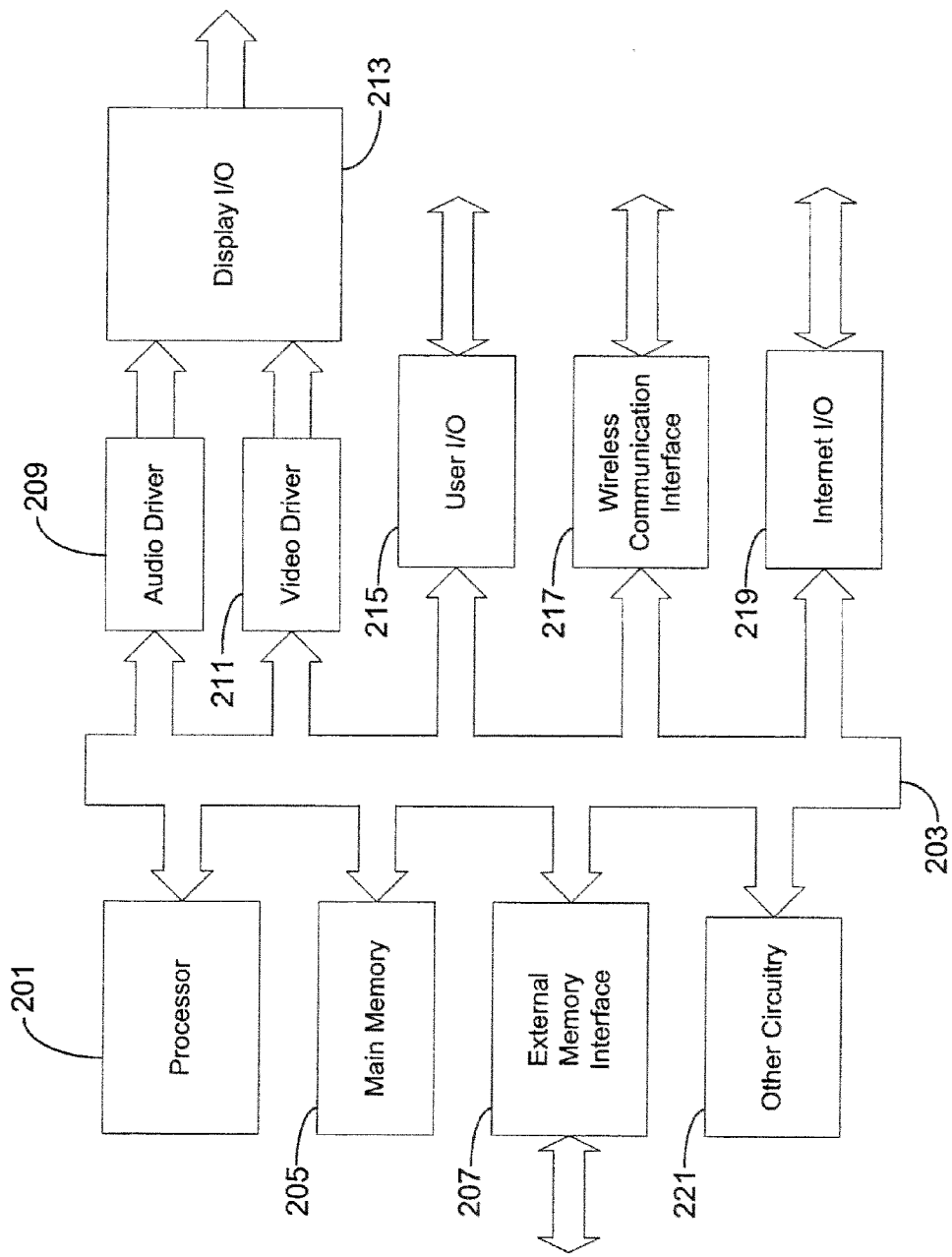
FIG. 2 is a block diagram of a processing unit in a video game console in accordance with aspects of the invention.

FIG. 2 is a block diagram of a processing unit in a video game console in accordance with aspects of the invention. In some embodiments, the processing unit includes at least one processor 201 connected to various other components via a system bus 203. Other components may include, for example, a main memory 205, an external memory interface 207, an audio driver 209 and a video driver 211, a display input/output port 213, a user input/output port 215, a wireless communication interface 217, an internet input/output port 219, and various other circuitry 221. In similar embodiments, there may be varying combinations of different components found in the processing unit, depending on the design and application needs of each respective video game console.

In FIG. 2, the processor executes software instructions and facilitates video game play by accessing and utilizing the various components in the processing unit through the system bus. The processor may retrieve video game instructions from an external memory source in the external memory interface, for example, a video game CD-ROM. The processor may also retrieve program instructions from the main memory, including for example, instructions for proper processing of the inserted external memory source holding video game information. Any resulting processed data may be stored back into the main memory for later reference by the processor. Various types of instructions for proper execution of a video game may include, for example, video game configuration information, game play instructions, information on processing different input signals provided by user operated game controllers, and how the input signals are used to determine audio and video outputs.

A video game controller or set of video game controllers, for example, the set of video game controllers illustrated in FIG. 1, may communicate with the video game console to affect video game play. The set of video game controllers transmit input signals for use by the processing unit, and execution of the video game is personalized based on the nature and content of the input signals. In some embodiments, the set of video game controllers communicates to the video game console through user input/output ports located on the video game console. In these embodiments, the communications are generally through wired connections. In other embodiments, the set of video game controllers communicates with the video game console via a wireless communication interface in the video game console's processing unit, for example, a wireless transceiver. In both of these embodiments, the input signals received by the video game console are provided to the processor for further processing.

The processor processes data pertaining to video game play and provides audio and video generation commands associated with video game play to, respectively, an audio driver and a video driver. The audio driver processes the audio generation instructions to produce an audio output signal, and provides the audio generation command to an audio input/output port. Likewise, the video driver processes the video generation instructions to produce a video output signal, and sends the video generation command to a video input/output port. In some embodiments, for example, the embodiment of FIG. 2, the audio and video input/output ports may be combined into a single display input/output port. A display unit capable of outputting audio and video signals is connected to the input/output port or ports, generally through a cable or similar wired connection.

Figure 3:
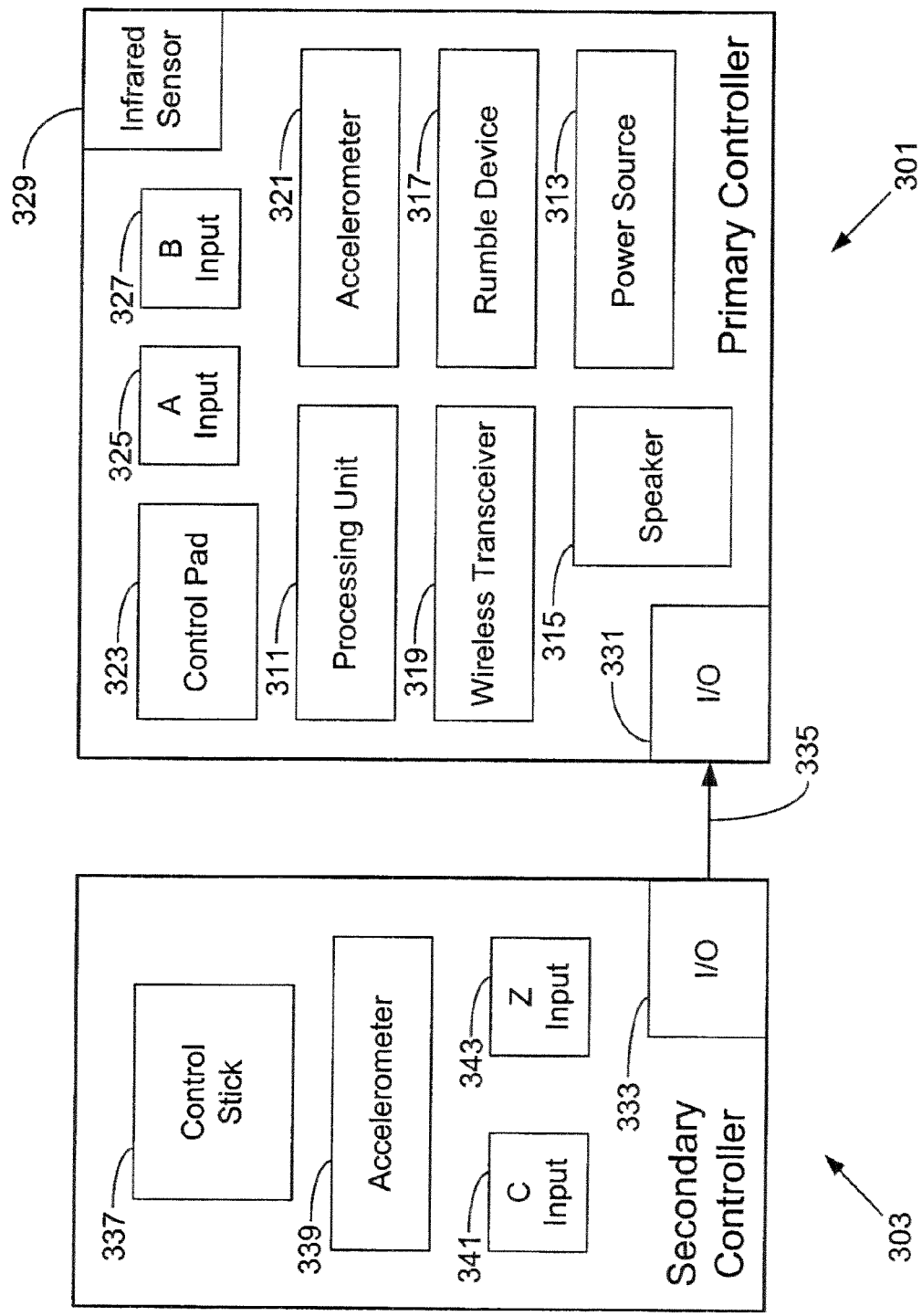
FIG. 3 is an example of a block diagram of a set of video game controllers interconnected in accordance with aspects of the invention.

FIG. 3 is an example of a block diagram of a set of video game controllers in accordance with aspects of the invention. In some embodiments, the set of video game controllers may be the set of video game controllers illustrated in FIG. 1, and may include a primary video game controller 301 and a secondary controller 303 connected to the primary video game controller.

The primary video game controller may include a processing unit 311, which in many embodiments may be comprised of circuitry for processing different types of input signals and for controlling other components which may be internal or external to the primary video game controller. In FIG. 3, the processing unit of the video game controller is connected to other internal components of the video game controller, including a power source 313, an audio speaker 315, a rumble device 317, a wireless transceiver 319, and different types of input devices. The input devices may include, for example, an accelerometer 321, or other device or devices providing position or motion information, a directional control pad 323, input buttons such as an "A" input 325 and a "B" input 327, and an infrared sensor 329.

The primary video game controller may also include an input/output port 331 to be used in communications with various secondary controllers or peripherals which may be attached to the primary video game controller. In the embodiment of FIG. 3, the primary video game controller is connected to a secondary controller. The secondary controller has its own input/output port 333, and sends additional input signals to the primary video game controller for processing through the input/output port. The primary video game controller and secondary controller are generally connected via a wired connection 335, but may in certain embodiments be connected and communicate with each other, or directly with the video game console, wirelessly. In some embodiments the primary video game controller and the secondary controller include the same or similar components. As illustrated in FIG. 3, however, input devices found on the secondary controller may include an analog control stick 337, an additional accelerometer 339, and additional input buttons, which in the embodiment of FIG. 3, are illustrated as a "C" input 341 and a "Z" input 343.

The components presented in the primary video game controller and the secondary controller in the block diagram of FIG. 3 are similar to the components which may be found in, for example, the Wii Remote and Nunchuk of the Nintendo Wii video game system. However, other video game controllers, associated with either the Nintendo Wii or a different video game console, may incorporate very different input devices, and that any types of input signals may generally be processed and utilized in accordance with the invention.

The set of video game controllers may, in some embodiments, be used as drum sticks used in the music rhythm video game associated with the invention. The accelerometers, which in many embodiments are three axis accelerometers, in each of the primary video game controller and the secondary controller generate signals based on acceleration and orientation changes of the video game controllers. A processor of a video game console receiving signals indicative of the video game acceleration and/or orientation changes may determine direction and extent of movement of the video game controllers. In some embodiments, the invention may alternatively utilize, for example, two Wii Remotes, or for example, two controllers tailored after drum sticks and designed specifically for video games including musical drum applications.

The accelerometers in each controller may generate input signals including position and movement related information, which may be processed by a processor in a video game console to determine corresponding drum related output instructions or commands. In some embodiments the infrared sensor may be used to generate input signals including position and movement related information, for example in conjunction with LEDs positioned about or on the television. In further embodiments gyroscopic devices, magnetic devices, or other devices may instead or in addition be used to provide movement related information.

Users holding one of the controllers in each hand may therefore simulate striking a drum head of a drum set with the set of video game controllers, using gestures, for example, generally downward strikes and, for example, different starting positions, different directions of motion, and/or different distances of motion, as if to reach for the different drum components in a drum set. For example, in some embodiments the processor determines that the game controller has changed orientation in space such that one end of the controller has moved to a lower position with respect to a center of the controller, in some embodiments the processor determines that the controller has moved downward, and ceased moving, and in some embodiments the processor determines, based on orientation and position change information, that the controller has mimicked motion of a drum stick striking a drum head.

Some of the different input devices located on each video game controller may be used to provide additional information for use by a processor of the video game console in determining drum related output instructions or commands. In some embodiments, pressing certain buttons, for example, the "C" input on the secondary controller, may cause the processor to determine to instruct or command a particular drum related output. Pressing and/or holding certain other buttons on either controller may result in different outputs associated with a particular striking gesture. In this manner, a variety of different drum sounds, simulating numerous different drums and other percussive instruments, may be mapped to the various input signal combinations associated with a set of video game controllers used in the invention. In addition, in some embodiments the processor may toggle between sounds, simulating different drum strikes of different drums, for successive strike gestures, and in some embodiments the processor may sequence through sounds simulating strikes of different drums. Further, in some embodiments a single downward gesture may result in simulation of multiple sequential drum strikes of either the same drum head or multiple drum heads.

The primary video game controller in FIG. 3 also includes other components which enhance the functionality of the primary video game controller, as well as the secondary controller, in varying ways. For example, the wireless transceiver provides a mode of wireless communication between the set of video game controllers and the video game console. The power source may provide power to the internal circuitry of the primary controller, including the wireless transceiver, as well as any secondary controller or peripheral which may be attached to the primary video game controller. The speaker and the rumble device are local output devices on the primary video game controller which may be utilized in different ways to enhance game play. For example, the rumble device may be set, by a command provided by the video game console, to actuate on downward gestures, as determined by the video game controller based on accelerometer information of the video game controller, for example to simulate vibration of a drum stick when it strikes a drum. The speaker may be used to, for example, provide local audio feedback, for example, to output an audio sample corresponding to a drum strike on one of the variety of different drums in the simulated drum set.

In some embodiments, the infrared sensor may also be utilized in video games involving drum simulations. Such configurations may function more accurately in embodiments with two primary controllers which both include infrared sensors, for example, two Wii Remotes, or for example, two controllers with infrared or optical sensors designed specifically for drum applications, such as a pair or drum stick simulation controllers. In these embodiments, infrared or optical sensors, or similar position detection sensors, may be calibrated before play to determine starting or idle positions of the video game controllers. Movement away from the idle positions may be communicated to the video game console, and strikes or downward movements in different positions may be translated by the video game console into different audio samples corresponding to different drum sounds. In such a fashion, a user may imagine having, for example, an invisible virtual drum set in front of them, whereby a downward movement in the idle position may correspond to a snare drum strike, a downward movement with the controller positioned to the right of idle may correspond to a torn strike, and a downward movement with the controller positioned to the left of idle may correspond to a cymbal strike. Numerous similar variations may be configured, and in some embodiments, users may be provided with configuration authority.

In yet other embodiments, one or both of the video game controllers, or additionally utilized video game controllers, may be incorporated into the invention. For example, some embodiments may provide for a foot pedal peripheral, or alternatively, a manner in which a user may tie or latch an associated video game controller to a leg of the user to detect leg movements. Such leg movement detection may be used, for example, in accordance with generation of a kick drum audio sample by the video game console.

Figure 4:
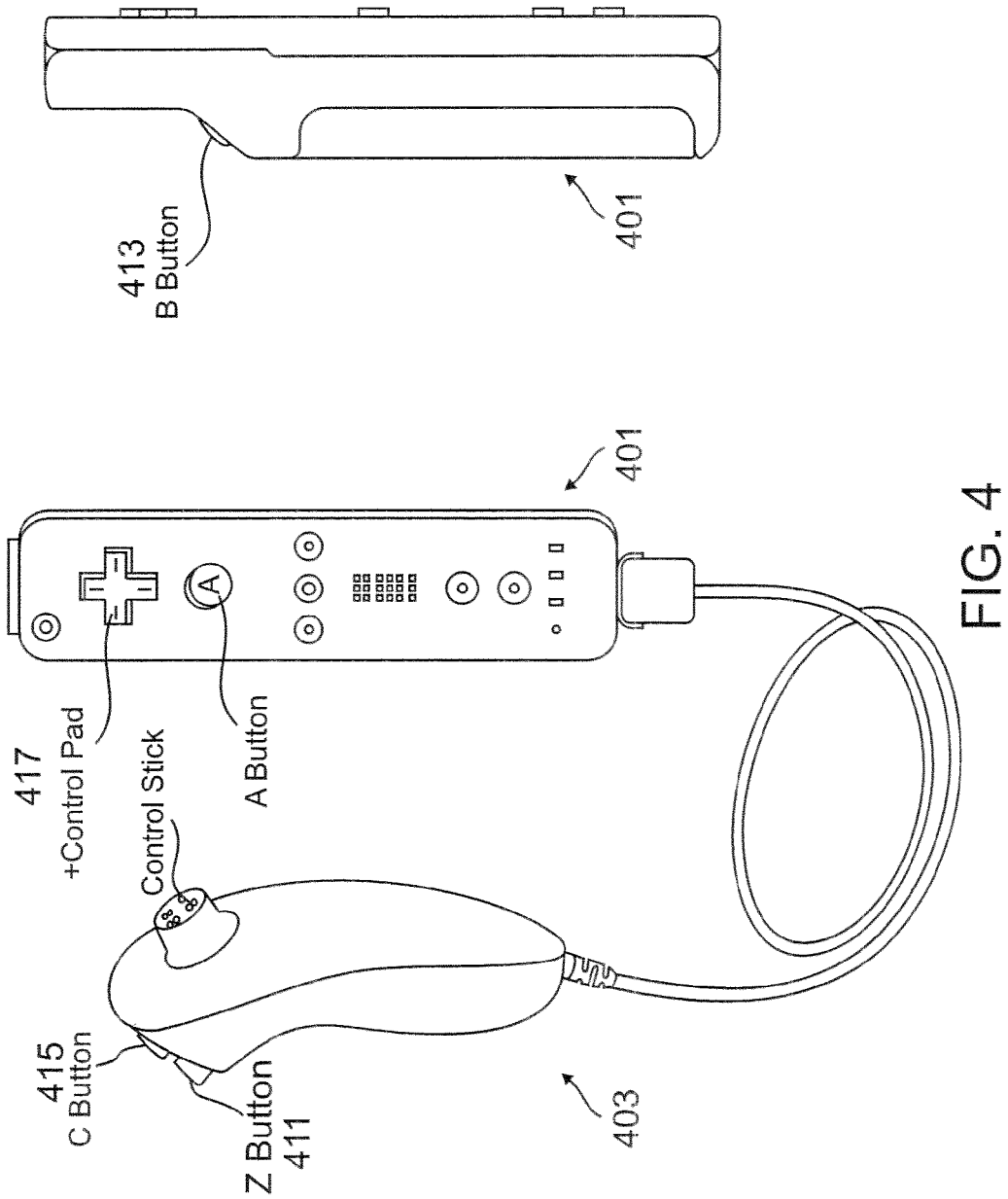
FIG. 4 is a visual representation of the location of different input button on a set of video game controllers in accordance with an embodiment of the invention.

FIG. 4 is a visual representation of the location of different input buttons on a set of video game controllers in accordance with an embodiment of the invention. In some embodiments, the set of video game controllers in FIG. 4 are a Wii Remote 401 and a Nunchuk controller 403, generally used in conjunction with a Nintendo Wii video game system. In some embodiments, FIG. 4 is a visual representation of the set of video game controllers represented by the block diagram of FIG. 3, discussed above. In other embodiments, different video game controllers may be used with the same or different video game consoles in accordance with the invention.

In FIG. 4, some inputs, for example, a "Z" button 411 on the secondary controller and/or a "B" button 413 on the primary video game controller, may generate input signals which are processed by a video game console to cause generation of a sound, for example, a cymbal strike. Other inputs, for example, a "C" button 415 on the secondary controller, may generate an input signal associated with entering an alternate mode of the invention, where gestures or inputs performed in the alternate mode may be processed by the video game console to output a different set of drum sounds than the same gestures or inputs performed in a regular mode. Still other inputs, for example, directional inputs of a control pad 417 of the primary video game controller, may be depressed or actuated to generate input signals which causes the video game console to select output sounds other than those that may be provided without depression or actuation of those inputs.

Figure 5:
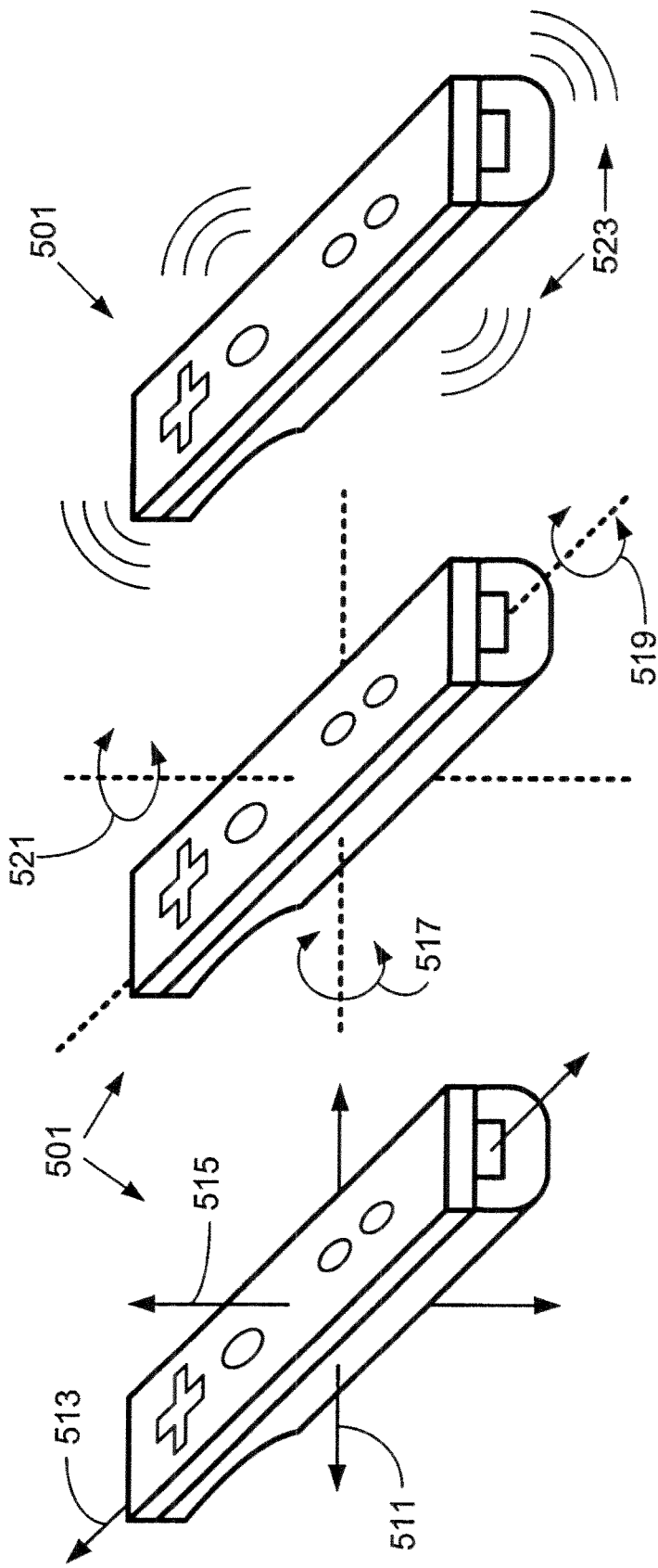
FIGS. 5a, 5b, and 5c are three illustrations of positional change and motions detectable by an accelerometer of a video game controller which may be used to determine output sounds to be generated in accordance with aspects of the invention.

FIGS. 5a, 5b, and 5c are three illustrations of positional changes and motions detectable by an accelerometer of a video game controller which may be used to determine output sounds to be generated in accordance with aspects of the invention.

A position related detection device providing signals regarding acceleration or motion of the video game controller, for example, an accelerometer, may provide signals based on motion and gestures of the video game controller and generate input signals for use by a video game console. Control circuitry in the primary video game controller may direct the signal to be transmitted to the video game console, for example, through a wireless transceiver in the video game controller, or to another video game controller for transmission to the video game console. A processor of the video game console may process the input signal to create audio and video generation instructions for generating audio and video output signals based on the different input signals associated with the motion of the video game controller.

FIG. 5a illustrates a primary video game controller 501 detecting motion in an x-axis 511, a y-axis 513, and a z-axis 515. In some embodiments, motion in the z-axis, for example, a downward gesture, may result in generation of an input signal processed by a video game console as a general drum strike. In most embodiments of the invention, a downward gesture is mapped to a frequently used drum output sound, for example, a simulated snare drum strike, as it may likely be the most natural and widely used gesture in embodiments where a set of video game controllers are used as a pair of drumsticks. Motions in an x-axis, for example, side to side motions, and motions in a y-axis, for example, forward and back motions may also be mapped to different audio outputs. Generally, input signals generated from movement in the x-axis and the y-axis are processed by the video game console to output drum output sounds which may be less commonly utilized than the drum, output sounds associated with movement in the z-axis. In some embodiment, the velocity of a movement or gesture may also be detected, and may, for example, alter the volume of the output sound associated with the movement or gesture.

FIG. 5b illustrates a primary video game controller 501 detecting rotation about an x-axis 517, rotation about a y-axis 519, and rotation about a z-axis 521. In certain embodiments, the rotations may be characterized as roll, pitch, and yaw motions. Roll may represent rotation about the y-axis, or rotations along a longitudinal axis of a video game controller. Pitch may represent rotation about the x-axis, for example, upwards and downwards tilting of the video game controller. Yaw may represent rotation about the z-axis, or adjusting left and right the direction a front of the video game controller is pointing.

In some embodiments of the invention, controller pitch changes may be detected and processed by the video game console to determine or alter output sounds. For example, the video game controller may be positioned pointing up before a downward gesture is made, simulating an anticipated strike. In some embodiments, a different output sound, or a different magnitude of the same output sound, may be generated by the video game console by pointing the video game controller up before a downward gesture, as compared to performing the downward gesture from a neutral position. In some embodiments, yaw may, for example, be used to simulate positioning of a drumstick over different drums in a drum set before striking, and downward gestures performed at different yaw positions may generate different input signals processed by the video game console to produce different drum output sounds. In addition, different velocities of motion of the controller may result in different volume for output sounds, with for example increased velocity of motion resulting in increased volume of output sound.

FIG. 5c illustrates a primary video game controller 501 detecting shaking or vibrating 523 of the video game controller. In some embodiments of the invention, an accelerometer of the primary video game controller and/or secondary controller may detect shaking. In some embodiments, input signals associated with shaking detection may be mapped to, for example, audio samples corresponding to a tambourine, maracas, or other like virtual instruments.

Figure 6:
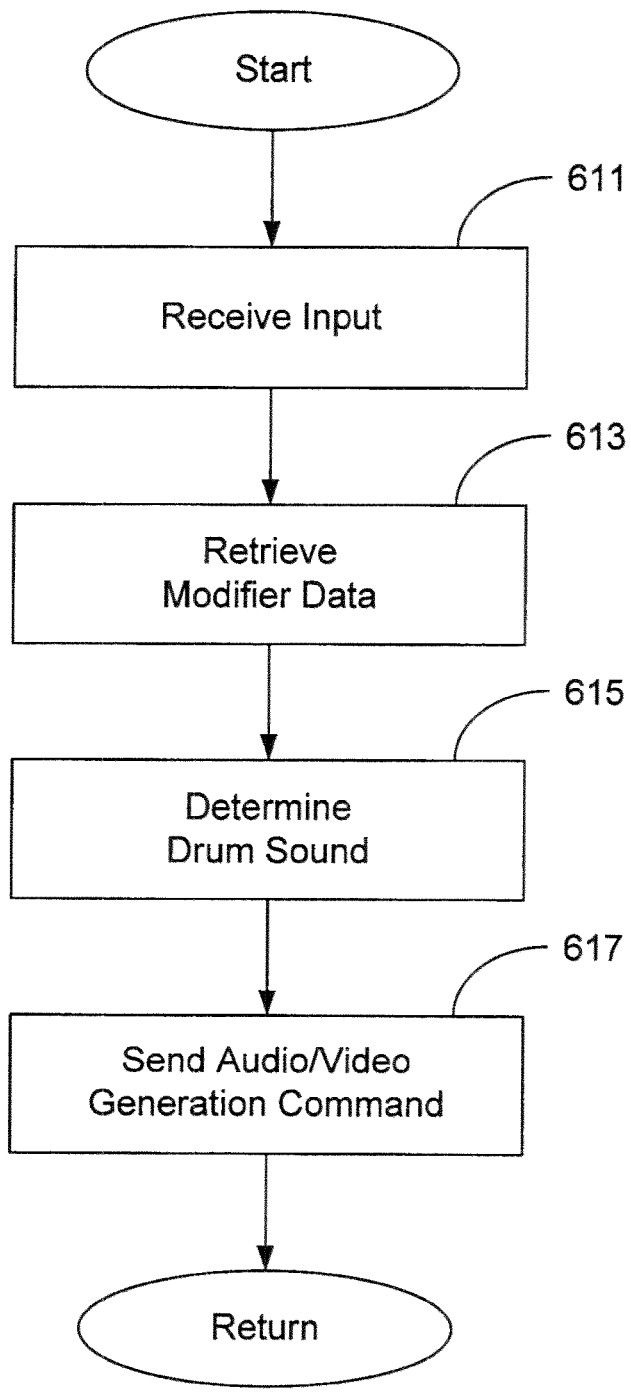
FIG. 6 is a flow diagram of the audio and video generation process in accordance with aspects of the invention.

FIG. 6 is a flow diagram of the audio and video generation process in accordance with aspects of the invention. In block 611, the process receives an input signal. In most embodiments, input signals originate and are generated from video game controllers communicating with a video game console, and the process is performed by a video game console or a processor. In embodiments of the invention, the video game controllers generate input signals based on either depressible input devices on the video game controllers, changes in position or movement of the video game controllers, or both. An input signal is sent by the control circuitry of a video game controller to a video game console communicating with the video game controller. For some input signals, a processor of the video game console receives the input signal, and proceeds to generate audio and video generation information based on the input signal. Some examples of such input signals may be, for example, a downward gesture mapped to a drum strike audio sample, or for example, depression of a button mapped to a cymbal crash audio sample. In some embodiments of the invention, additional input signals may be considered as modifiers, with changes in the additional input signals being used to determine outputs, alone or in conjunction with the input signal, upon a triggering event determined using the input signal. In these embodiments, the additional inputs designated as modifier inputs may be ignored by the process until an input signal, for example otherwise mapped to a particular output signal, is received.

In block 613, the process retrieves modifier data. In embodiments of the invention, the process may retrieve status information of all the additional inputs of the video game controller, including modifier inputs. In some embodiments modifier data retrieval is performed when an output generating input signal is received. In many embodiments the process simply determines states of the additional input signal on a periodic basis or upon the occurrence of a predefined event, for example when an input signal is determined to be an output generating input signal. The modifier data may be taken into account by a processor of the video game console in producing the audio and video output generation information associated with the input signal, and may serve to select an output other than a particular output associated with the input signal, or lead to the generation of completely different outputs altogether. Modifier input types on the video game controller may include, for example, pressing or holding certain input devices on the video game controller. Such input devices are typically less frequently used or less accessible input devices when compared to input devices which generate input signals mapped to output signals. Other modifier input types may include, for example, additional signals corresponding to positioning of the video game controller at the time of the strike, or for example, the velocity of the movement of a downward gesture.

In block 615, the process determines a drum sound based on the input signal and modifying data. In embodiments of the invention, each output signal represents a simulated output of a corresponding sound in a complete drum set. Therefore, with a limited number of input signals available for use, different input-modifier combinations may be used to map each of the different components of the drum set or drum kit. Potential output signals may simulate, for example, a snare drum, a kick drum, toms, a variety of different cymbals, and additional instruments, for example, a cowbell and a tambourine. In some embodiments, some input-modifier combinations may also be mapped to frequently used output combinations, for example, simultaneous snare drum and hi-hat cymbal strikes, or for example, simultaneous snare drum and kick drum strikes. In some embodiments, the processor of the video game console may determine the drum sound associated with the input signal and modifying data in accordance with the flow diagrams of FIGS. 8-10, further discussion of which is found below. In some embodiments, the input signal and additional modifying data may be used by the processor of the video game console to reference a lookup table, typically stored in memory or with other video game instructions on, for example, a video game CD-ROM, to determine the drum sound. In other embodiments of the invention associated with different instruments or different applications altogether, similar input-modifier combinations may be used to map various different outputs associated with the various different instruments and applications.

In block 617, the process creates and sends audio and video generation commands based on the determined drum sound. The generation commands may be in the form of audio and video generation instructions, to be sent, respectively, to audio and video drivers to be processed into audio and video output signals. The output signals may be relayed to the display unit for audio and video output. In embodiments of the invention, after a drum sound is determined, the processor may access, for example, a key or reference listing the audio and video output signals associated with the determined drum sound. The reference may be stored and accessed either in the external memory source holding video game instructions, or may have earlier been stored into the main memory of the video game console. An audio output generated from the process may be a simulated drum sample or sound byte created or recorded from, for example, a drum in a real drum set. A video signal generated from the process may be in the form of a notation on a video user interface corresponding to the particular audio sample or sound byte. In some embodiments, the video user interface may be the user interface as was described with respect to the video game system of FIG. 1 and the user interface as is discussed below with respect to FIG. 7. After the processor creates and sends the respective generation commands to the audio and video drivers, the process returns.

Figure 7:
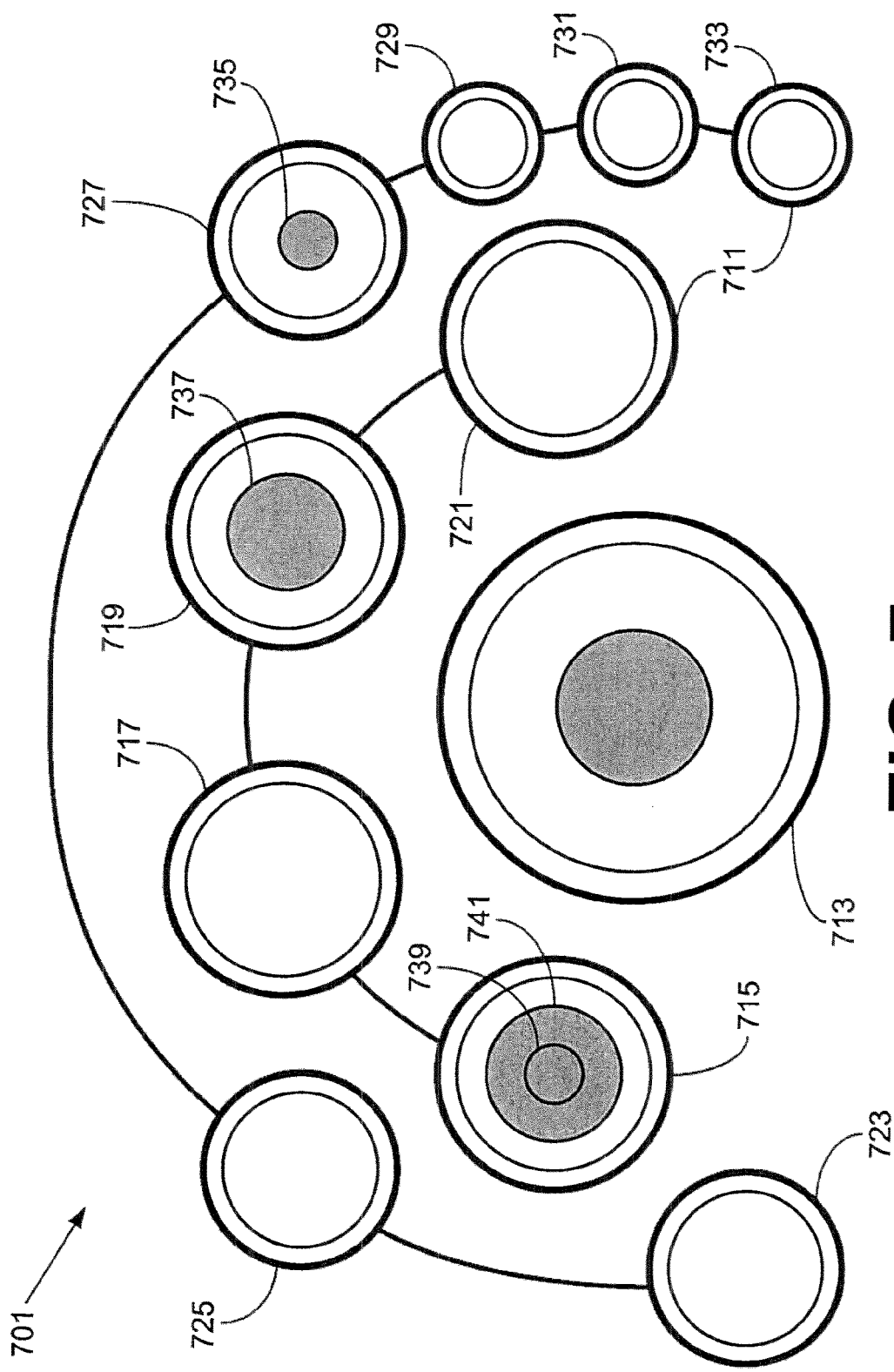
FIG. 7 is an example of a video user interface in accordance with aspects of the invention.

FIG. 7 is an example of a video user interface in accordance with aspects of the invention. In certain embodiments, the user interface 701 of FIG. 7 is a visual representation of the virtual drum set as has been described with regards to the invention. The user interface includes a plurality of circular icons, for example, icons 711, each individual circular icon representing a different drum component of a drum set. In some embodiments, for example, the embodiment illustrated in FIG. 7, the drum set may include circular icons representing the simulated sounds of a kick drum 713, a snare drum 715, a high tom 717, a mid tom 719, a floor tom 721, a hi-hat cymbal 723, a crash cymbal, 725 a ride cymbal 727, a cowbell 729, a tambourine 731, and a splash cymbal 733. In other embodiments of the invention, a different set of outputs may be represented by a similarly constructed user interface. Some embodiments may provide for user configuration of the interface, and may provide options for substituting different drums in and out of a particular drum set. Some embodiments may also provide for ways to increase the number of available drums which may be added to a user interface, for example, as a reward for satisfaction of specific game play milestones or goals, or for example, through an online store where different drums and their associated audio samples may be purchased for use.

The user interface may be used as an audio output indicator. In some embodiments, the individual circular icons light up or change color when the corresponding audio output is played. For example, in FIG. 7, the icon 715 corresponding to the snare drum audio output is colored in, meaning the snare drum audio output is being played or has just been played. Likewise, the kick drum icon 713 is colored in, indicating a corresponding audio output of a simulated kick drum.

In some embodiments, different types of animation may be applied to the icons to indicate different actions. For example, in some embodiments, at activation of a particular audio sample or sound byte, the entire icon corresponding to that audio sample or sound byte may be colored in, with the colored portion diminishing in size with the passage of time. In the screenshot of FIG. 7, the colored area 735 of the ride cymbal icon 727 is smaller than the colored area 737 of the mid torn 719. This may indicate that the ride cymbal was activated earlier than the mid tom, or that more time has elapsed since the playing of the ride cymbal audio output than the playing of the mid tom audio output. In other embodiments, multiple strikes may also be represented by a different animation. For example, the snare drum icon 715 includes two coincident colored circles, a first colored circle 739 smaller than a second colored circle 741. This may indicate that two separate snare hits were received recently, one after the other.

In some embodiments, the user interface of FIG. 7 may provide users with instructive cues as to how to operate a set of video game controllers associated with video game play. For example, in some embodiments, a colored circle may enlarge with time within one of the circular icons until the entire icon is colored in. In these embodiments, a user may be instructed to use the set of video game controllers to generate the input signal mapped to the particular audio output represented by the colored circular icon at the instant the entire icon has been colored in.

Figure 8:
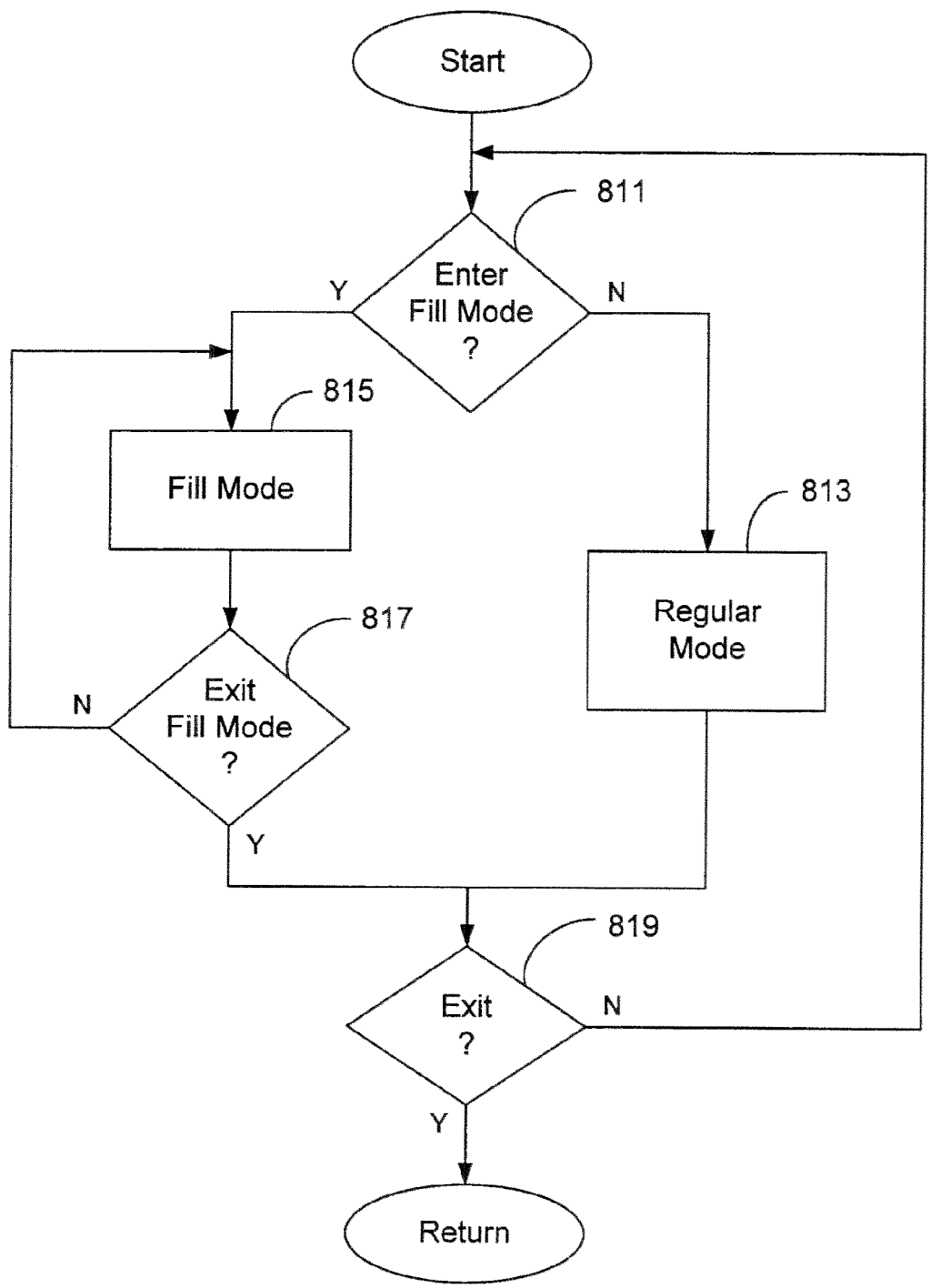
FIG. 8 is a flow diagram of a process of determining audio outputs based on input signals and certain modifying data in accordance with aspects of the invention.

FIG. 8 is a flow diagram of a process of determining audio outputs based on input signals and certain modifying data in accordance with aspects of the invention. In some embodiments of the invention, a fill mode may be available for activation, which provides users access to a predefined output set, or drum fill, the drum fill including a sequence of successive output sounds, each sound outputted when the video game console receives and processes a downward gesture from either of a set of video game controllers. Successive downward gestures lead to the generation of the sequence output sounds in the drum fill in order. In most embodiments, the drum fill sequence repeats after the last output sound in the drum fill has been played, thereby providing an auto-looping feature. In a real band, drum fills provide a sequence of appealing drum beats which may be used, for example, to lead into a song, or for example, to fill gaps between songs or during measures of rest within a particular song. A fill mode may provide access to an easy drum fill to serve the same purpose in the context of the invention. In some other embodiments, a fill mode or similar mode may be used to generate, for example, a repeating background drum beat, where users would subsequently be allowed to return to a regular mode and simulate the play of drums over the background beat. In these embodiments, prerecorded fills or similar audio sample sequences may be utilized by users to, for example, add depth to a musical composition, providing to users direction and control over multiple parts of the composition. In addition, in many embodiments recordation of downward gestures, or results of downward gestures, are adjusted, constrained, or locked to occur at regular time periods, for example to a $\frac{1}{16}$ note interval closest to when the gesture is made. Further, in some embodiments multiple drum fills may be recorded, with each of the drum fills played simultaneously.

In block 811, the process determines whether to enter fill mode. Entering fill mode may be performed when the video game console receives a predefined input signal from one or both of the set of video game controllers. In some embodiments, for example, an embodiment using the video game controllers illustrated in FIG. 4, fill mode is entered when the video game console receives an input signal generated when the "C" button on the secondary controller is depressed. If the process determines that fill mode has not been entered, the process proceeds to block 813. If the process determines that fill mode has been entered, for example, receiving a "C" button input signal in the example above, the process proceeds to block 815.

In block 813, the process is in regular mode. In regular mode, the different input signals and modifying input signals are processed according to video game instructions found either in the external memory source holding the video game instructions, or in the main memory. Further discussion of one embodiment of regular mode can be found in FIG. 9 below.

In block 815, the process is in fill mode. In fill mode, a predefined drum fill is used as the output sequence instead of processing each individual input signal to generate a different audio output. In fill mode, some input signals may be processed by the video game console to generate one output of the sequence of outputs in the predefined drum fill, while other input signals may do nothing. Therefore, unlike in regular mode, the same input signal may lead to the generation of different output sounds, based on the current progress of the drum fill. For example, in a drum fill with an audio output sequence of snare, hi-hat, snare, snare, hi-hat, successive identical downward gestures may lead to the generation of a snare audio sample followed by a hi-hat audio sample, or vice versa. An embodiment of fill mode is further described with respect to FIG. 10 below.

In some embodiments, a fill mode may be used to establish background beats by utilizing user recorded or prerecorded audio samples or fills. For example, some embodiments may provide for recording of a short or long duration of user generated audio samples in a fill mode, and subsequently establish a background audio track based on the recording. Users may then return to a regular mode and operate the video game controllers to generate additional audio samples over the drum fills through the video game console. In some of these embodiments, recorded audio samples may be visually displayed, for example, on an additional music track or card to provide user feedback. In other embodiments, a background fill may simply comprise a repeated single beat using one of the plurality of available audio samples, such as a hi-hat cymbal audio sample. Some embodiments may provide users options to change the audio sample or the tempo at which the audio sample is being repeated, depending on the particular embodiment.

In block 817, the process determines whether to exit fill mode. In some embodiments, once fill mode is entered, the same input used to enter fill mode, or a different predefined input signal, may be processed by the video game console to exit fill mode. While a drum fill sequence in fill mode may have a catchy beat and is easy to execute, since the output sounds are predefined, staying in fill mode limits access to other output sounds not found in the drum fill and hinders creativity in use of the invention. If the process determines an input signal corresponding to exiting fill mode has not been received, the process remains in fill mode and returns to block 815. If the process determines to exit fill mode, the process proceeds to block 819.

In block 819, the process determines whether to exit the audio output determination process. If the process determines to stay in audio output determination, the process returns to block 811 to determine if fill mode is to be entered. If the process determines to exit audio output determination, the process returns.

Figure 9:
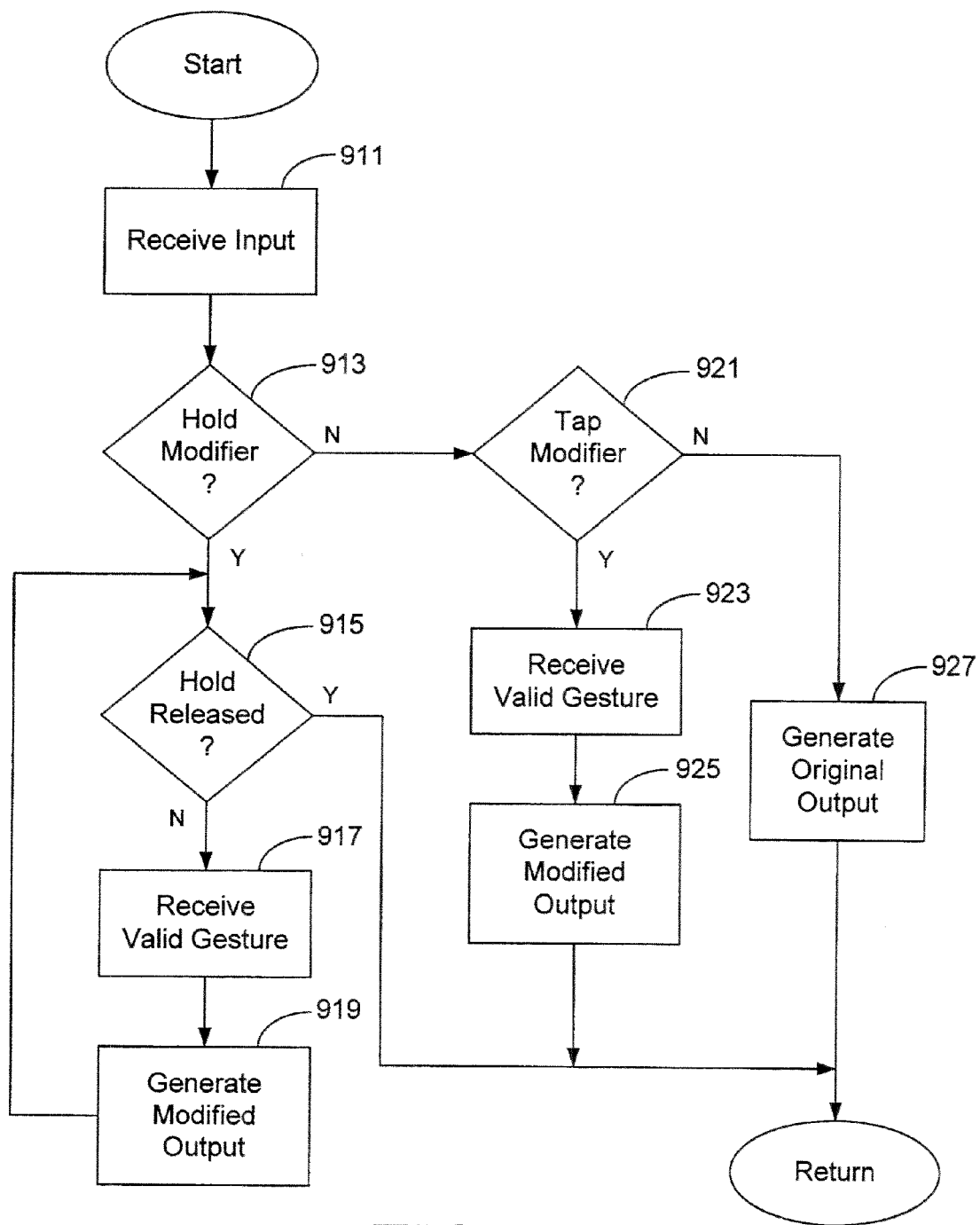
FIG. 9 is a flow diagram of a regular mode of audio output determination in accordance with certain embodiments of the invention.

FIG. 9 is a flow diagram of a regular mode of audio output determination in accordance with certain embodiments of the invention. In some embodiments, the process of FIG. 9 may be performed as part of block 813 of the process of FIG. 8.

In block 911, the process receives an input signal. In most embodiments, a video game console receives input signals from a video game controller with which it is communicating. Input signals may be generated through various actions, for example, changes in position or motion of the video game controller, or for example, actuation of input buttons or other input devices available on the video game controller. In most embodiments, the process is performed by a processor located in the video game console in accordance with video game instructions from an external memory source inserted into the video game console. In the embodiment of FIG. 9, input signals received from the video game controller fall into three different categories, hold modifiers, tap modifiers, and output generating input signals.

In block 913, the process determines if the received input signal is a hold modifier. Hold modifiers modify output signals mapped to input signals received while the hold modifier is still activated. In some scenarios, hold modifiers may distort or otherwise modify the original output signal generally associated with the input signal. In other scenarios, for example, particular hold modifiers used in conjunction with downward gestures, the hold modifier may be processed by the video game console to change the output to an entirely different output sound. If the initial input signal is a hold modifier, the process proceeds to block 915. If the initial input signal is not a hold modifier, the process proceeds to block 921.

In block 915, the process determines if the hold modifier has been released. If the hold modifier is released prior to a new incoming signal, the process returns. If, however, a valid gesture, for example, a downward gesture or a leftward gesture, of the video game controller is received by the video game console prior to release of the hold modifier, the process proceeds to block 917.

In block 917, the process receives an input signal corresponding to a valid gesture from a video game controller. In most embodiments, valid gestures include at least downward gestures. Some embodiments may also categorize gestures of the video game controller in other directions as valid gestures. There are also invalid gestures associated with each hold. If an input signal corresponding to an invalid gesture is received, the process may ignore it and do nothing.

In block 919, the process generates what may be considered a modified output signal. The signal is different than, or could be considered modified from, an output signal that would have been played had there been no hold modifier. In these embodiments, whereas a regular downward gesture may be mapped to, for example, a snare drum audio sample, a downward gesture with a particular hold modifier, for example, the "A" button on the primary video game controller discussed herein, may instead be processed by the video game console to generate an open hi-hat audio sample. In some embodiments, hold modifiers may be mapped to popular audio sample combinations, for example, a simultaneous snare drum and hi-hat cymbal audio sample. After a modified output has been generated, the process returns to block 915 to determine if the hold modifier has been released.

In block 921, the process determines if the initial input signal is a tap modifier. Like hold modifiers, tap modifiers modify the sound of an expected output, either by distorting the original sound, or by mapping a different output sound to the subsequently received input signal. However, unlike hold modifiers, tap modifiers are activated by a short depression and release of the particular input on the video game controller. The tap modifier, even after released, may modify the output signal associated with a subsequently received valid gesture. In some embodiments, tap modifiers may be implemented because the position of the associated input devices on the video game controller may make them harder to access, or may prevent effective holding during game play. An example of such an input device may be the directional control pad on the primary video game controller discussed herein. In other embodiments, some input devices on the video game controller may be used as either a tap modifier or a hold modifier, the modifier signal generated being dependent on whether the input is tapped or held. If the initial input signal is determined to be a tap modifier, the process proceeds to block 923. If the initial input signal is determined not to be a tap modifier, the process proceeds to block 927.

In block 923, the process receives an input signal corresponding to a valid gesture from a video game controller. The set of valid gestures may match the set of valid gestures associated with the process performed in block 917. And similar to the process of block 917, the process may ignore input signals corresponding to invalid gestures.

In block 925, the process generates a modified output signal. The process is similar to the process described with respect to block 919, with the only difference being that different modifiers are being applied to the subsequently received gesture, providing for an even wider range of potential output sounds which may be generated by the invention. After the modified output sound is generated, the process returns.

In block 927, the process generates an output based on the initial input signal. As the input signal has been determined not to be a hold modifier input signal or a tap modifier input signal, it is an input signal mapped to an output signal. The processor of the video game console may process the input signal and generate an output signal based on the input signal without any modifiers applied. The input signal may be generated from either gestures, for example, downward gestures of the video game controller, or from input devices located on the video game controller which have been activated. In some embodiments, different effects may also be created using input signals with no modifiers. For example, in some embodiments, when fast alternating gestures are made on the video game controllers, a drum roll is generated. In other embodiments, repeating the same input successively within a certain time frame may cause the output signal mapped to the input to be repeated or looped. After an output signal has been generated, the process returns.

Figure 10:
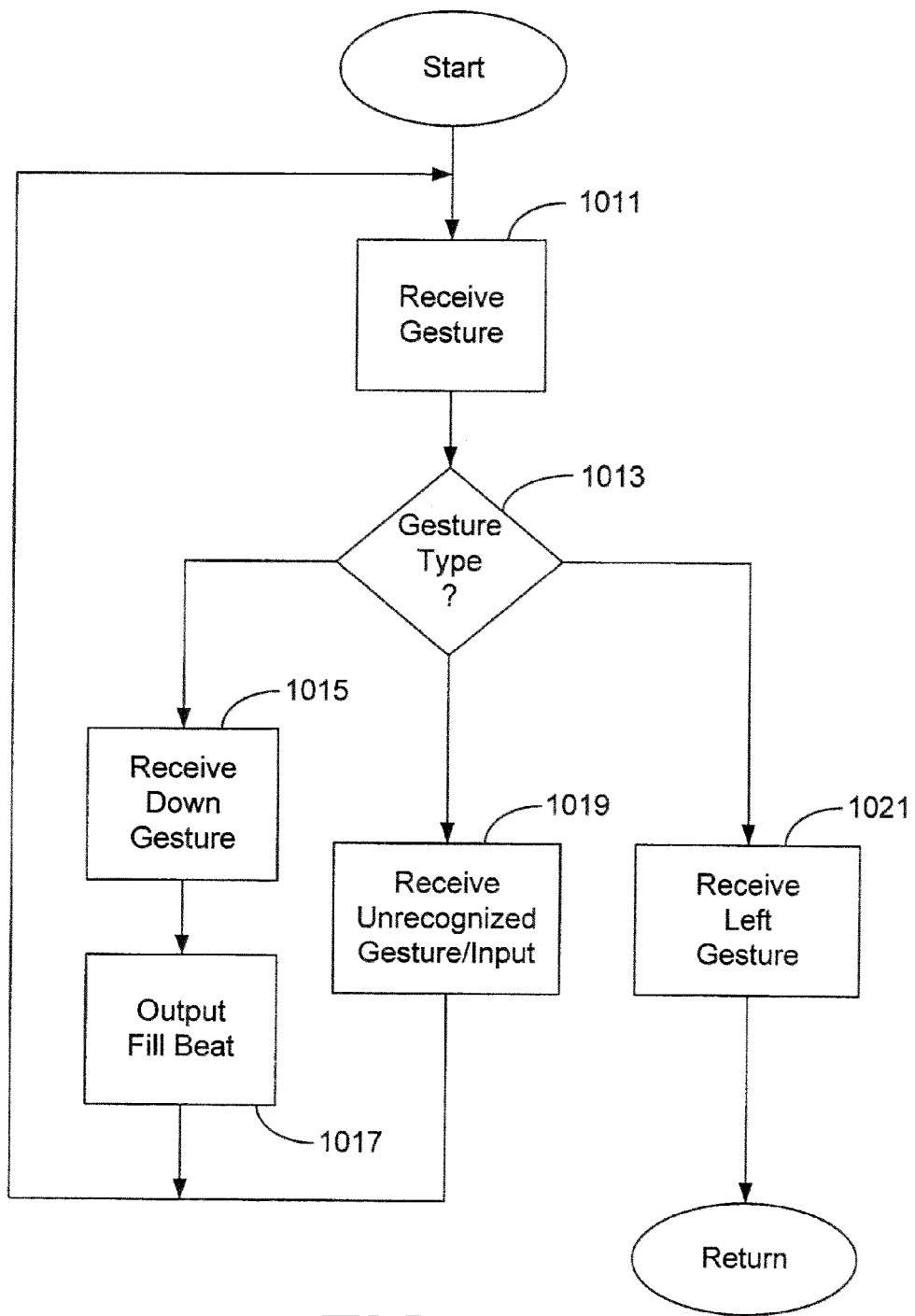
FIG. 10 is a flow diagram of a process of generating audio outputs in fill mode in accordance with aspects of the invention.

FIG. 10 is a flow diagram of a process of generating audio outputs in fill mode in accordance with aspects of the invention. In some embodiments, the process of FIG. 10 is performed as part of block 815 of the process of FIG. 8, after fill mode has already been entered. In fill mode, or similar mode in other applications, selected inputs may be recognized and continue contributing to output generation, whereas other inputs may not. In the embodiment of FIG. 10, a fill mode outputs a drum fill, or sequence of predefined audio outputs, when a valid input signal is received by the video game console. The predefined outputs may be, for example, a sequence or sequences of audio samples provided with the video game and stored on the video game CD-ROM. In some embodiments, the predefined outputs may be user generated, for example, pre-recorded by the user in a separate video game mode or setting, such as a free play and/or recording mode, prior to participating in regular game play. The same input signal may be processed by the video game console to generate different successive sounds depending on the sequence of audio outputs in the drum fill. In other embodiments, a fill mode may map each input to a different corresponding output, and in those embodiments fill mode may function similarly to a regular mode, for example, the process described in FIG. 9.

In block 1011, the process receives a gesture. In the embodiment of FIG. 10, gestures made to a video game controller may be recognized in fill mode, but input signals from input devices on the video game controller may not. Fill mode provides a simple means to fill in gaps of music with an appealing predefined beat. It may therefore be desirable to keep inputs simple in fill mode, for example, only outputting drum fill beats when the video game console receives a down gesture. In other embodiments, select input signals generated from depressible input devices may be recognized in fill mode as well.

In block 1013, the process determines the gesture type. In the embodiment of FIG. 10, if a down gesture is received, the process proceeds to block 1015. If a left gesture is received, the process proceeds to block 1021. If any other gesture is received, the process proceeds to block 1019. In embodiments where input signals from input devices on the video game controller are also recognized, the process may likewise proceed to one of the three aforementioned blocks, depending on the purpose each different input signal serves in the fill mode.

In block 1015, the process receives a down gesture. In the embodiment of FIG. 10, the down gesture is the only recognized gesture which is processed by the video game console into an output sound in the drum fill. Similar embodiments may only recognize particular easy to perform gestures and inputs to allow users to rest or take a breather during fill mode. As the drum fill output sounds are predefined, another reason for only recognizing particular inputs may be to restrict drum fill output sounds from being output whenever any movement is detected or an input device is inadvertently activated. Various other embodiments may also recognize other select input signals as valid inputs.

In block 1017, the process outputs a predefined beat in the drum fill sequence. An output sound in a drum fill sequence may be generated, and a next output sound in the drum fill sequence may be designated by the process to be the output sound generated when the next valid gesture is received. In most embodiments, a drum fill sequence may only comprise a short duration, for example, a measure of a song. In these embodiments, after the last output sound in the drum fill sequence has been generated, the drum fill repeats, with the next designated output being the first output sound in the drum fill sequence. After a beat in the drum fill sequence has been output, the process returns to block 1011 to receive another gesture.

In block 1019, the process receives an unrecognized gesture or other input signal. In the embodiment of FIG. 10, unrecognized gestures may include up gestures and right gestures. Other embodiments may define different gestures or inputs which are not used in fill mode. If an unrecognized gesture or input is received while the video game is in fill mode, the process does nothing, and the process returns to block 1011 to receive the next gesture.

In block 1021, the process receives a left gesture. In the embodiment of FIG. 10, the video game console may exit fill mode upon receipt of an input signal corresponding to a left gesture. In other embodiments, other predefined gestures or input signals may be designated for exiting the fill mode. When a gesture or input designated for exiting fill mode is received, the process returns, returning in most embodiments to a regular mode of the video game. Notice in FIG. 10, the other input signals cause the process to remain in fill mode.

Figure 11:
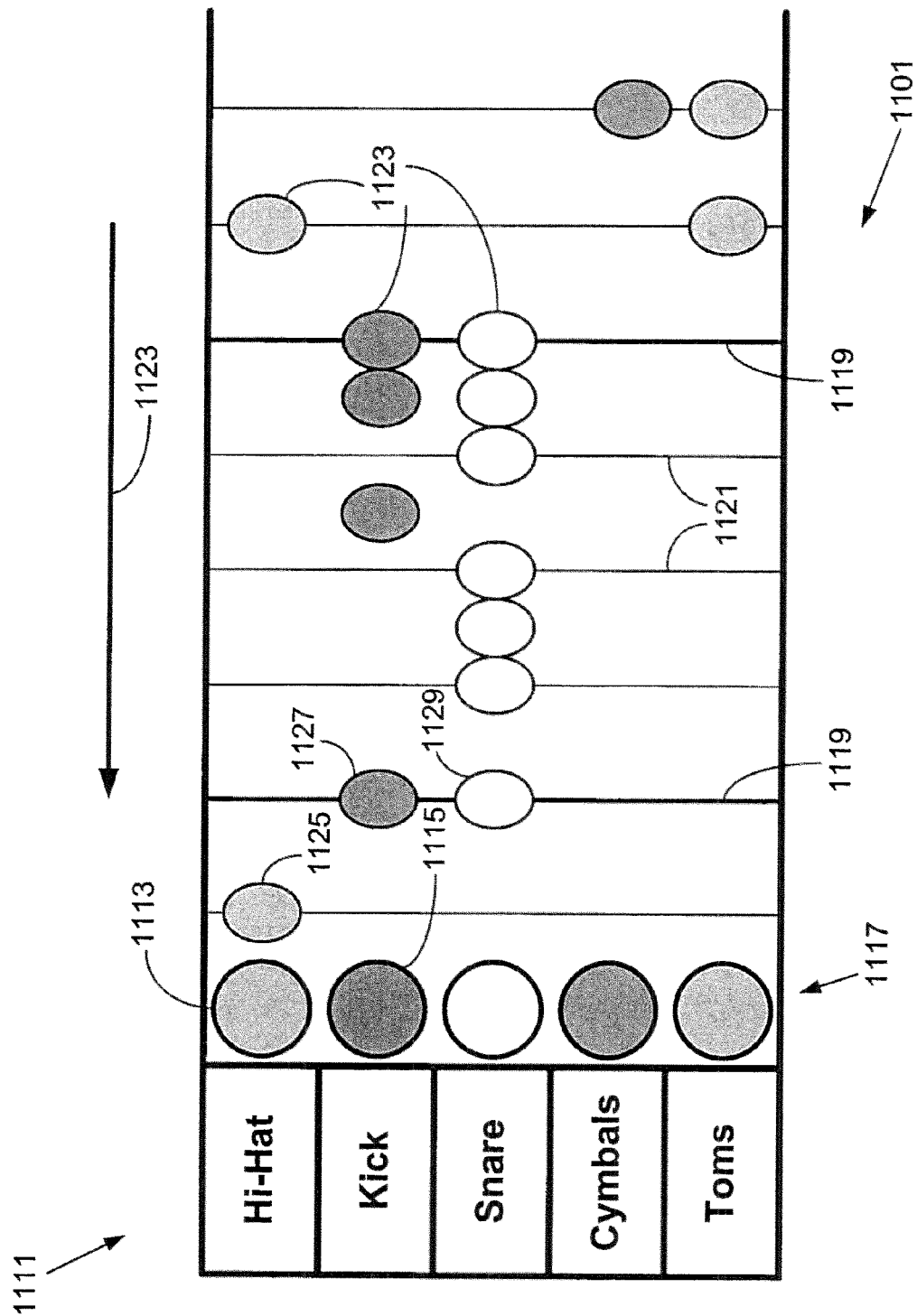
FIG. 11 is an example of a user interface with instructive cues in accordance with aspects of the invention.

FIG. 11 is an example of a portion of a user interface with instructive cues in accordance with aspects of the invention. The user interface 1101 may be presented during video game play of a music rhythm video game utilizing aspects of the invention. As illustrated the instructive cues may be considered to be arranged and displayed horizontally with respect to time, in various embodiments the instructive cues may instead be arranged and displayed vertically with respect to time, and in some embodiments over portions of other elements of the user interface, for example portions of icons representative of drum heads. The user interface includes a column 1111 listing names of different output sounds in a typical drum set. In the embodiment of FIG. 11, the output sounds listed include a hi-hat, a kick drum, a snare drum, cymbals, and toms. In other embodiments, various different combinations of output sounds from a drum set may be listed. Each of the representative output sounds has a corresponding colored icon located next to the name. For example, a circular icon of a first color 1113 is displayed next to the "Hi-Hat" name, and a circular icon of a second color 1115 is displayed next to the "Kick" name. The collection of icons comprise a column of different colored icons 1117, the column representing different drum output sounds which may be played using the invention. The location of both the drum output sound titles and corresponding icons may be fixed within the user interface.

To the right of the titles and icons is a timeline with vertical demarcations. The timeline may be viewed as a moving virtual music sheet including instructive cues as to how to operate a set of video game controllers to be in compliance with video game play. The instructive cues may represent musical notes or drum beats associated with the invention. In the embodiment of FIG. 11, the darker demarcations 1119 separate measures in the virtual music sheet, and the lighter demarcations, for example, demarcations 1121, represent individual beats within each measure. As indicated by an arrow 1123, the moving virtual music sheet of FIG. 11 moves from right to left, generating new beats and measures at a right edge of the music sheet, and terminating at a left edge defined by the column of icons corresponding to the available simulated output sounds of the drum set.

On the timeline are found a plurality of gems, for example, gems 1123, corresponding to the notes to be played using the invention. The gems move with the music sheet from left to right. When the gems reach the icons corresponding to each individual output sound, users may operate the set of video game controllers described above to generate the appropriate input signal or input-modifier combination corresponding to the output sound represented by the icon. Rewards, for example, game play points, may be given for compliance with the instructive cues on the user interface. For example, in FIG. 11, a gem 1125 is about to overlap the Hi-Hat icon. When the overlap occurs, the input signal or signals mapped to the hi-hat output sound is to be generated by the set of video game controllers. On the subsequent beat of video game play, a kick drum gem 1127 and a snare drum gem 1129 appear. When the kick drum gem and snare drum gem overlap the respective icons, the input or inputs corresponding to the kick drum and snare drum output sounds are to be performed or executed on the set of video game controllers simultaneously. In some embodiments, there may alternatively be an input-modifier combination which is mapped to two simultaneous sounds. For example, a particular input-modifier combination may represent simultaneous kick drum and snare drum strikes, and generating the input-modifier combination may be an alternate way to comply with the instructive cues. In certain embodiments of the invention, compliance may be awarded with points in the context of video game play, whereas non-compliance may result in no additional points. In some embodiments, non-compliance may also result in various penalties, for example, a reduction in points, in the context of video game play.

In separate embodiments, different user interfaces with instructive cues may be presented to users for compliance purposes. Some of these embodiments may incorporate aspects of the interface described with respect to FIG. 11. For example, similar instructive cues may be utilized, but the music track may be presented in scrolling fashion in various different directions, for example, top to bottom, or for example, in a three dimensional perspective from back to front. In other embodiments, for example, as was briefly described with respect to the interface of FIG. 7, instructive cues may be presented to users in formats very different from the interface of FIG. 11, while still maintaining the general idea of promoting user compliance in operation of the set of video game controllers associated with video game play.

Figure 12:
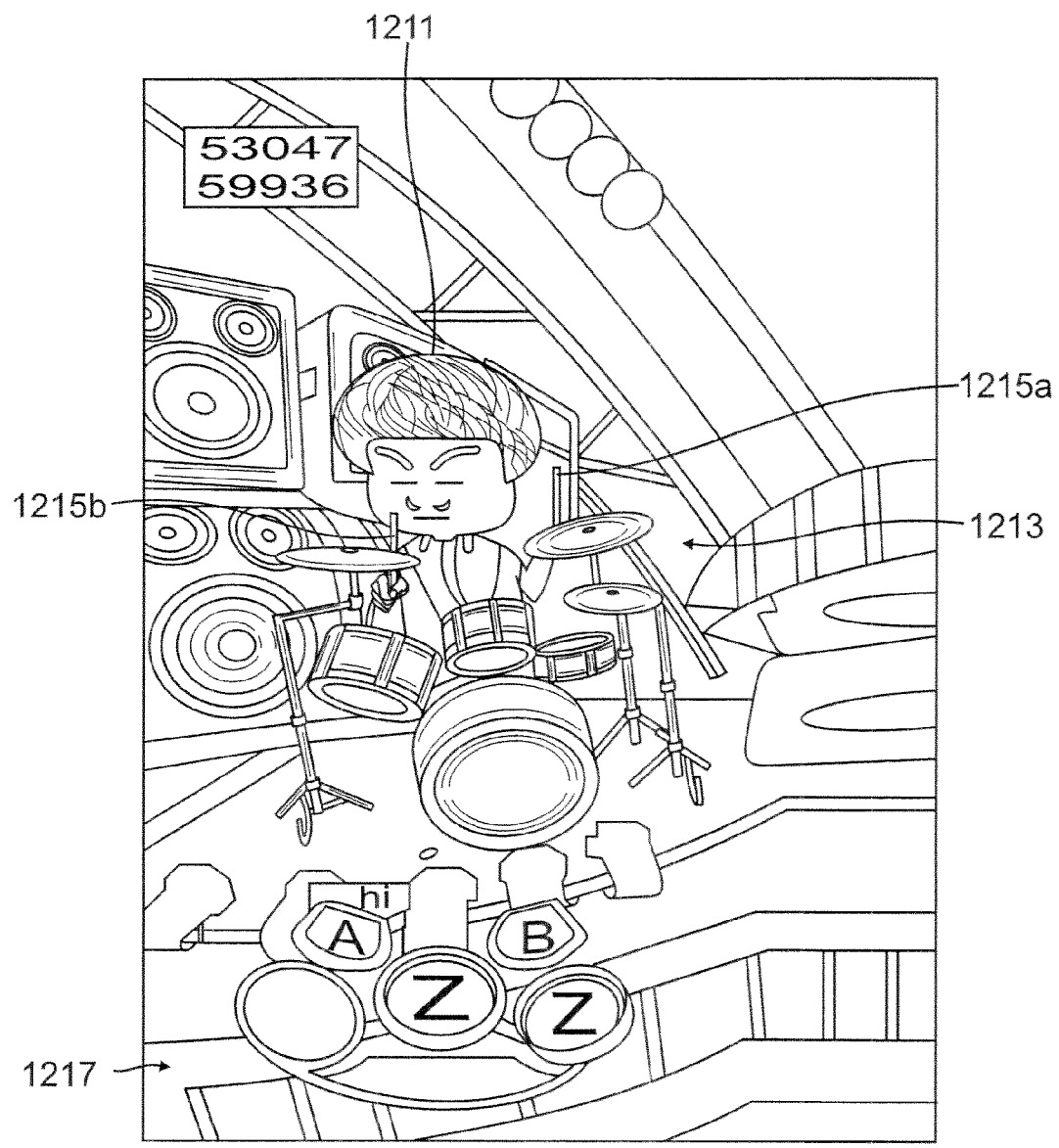
FIG. 12 is an example partial screen shot of a further video user interface showing a drummer, a drum set, and drum head icons in accordance with aspects of the invention.

FIG. 12 shows portions of a further embodiment of a display in accordance with aspects of the invention. A drummer 1211 is displayed behind a drum set 1213. The drummer holds drum sticks 1215a,b, one in each hand. As illustrated in FIG. 12 the drum sticks are in a vertical position, pointing upwards. Before the drum set is a representation 1217 of drum heads of the drum set.

Figure 13:
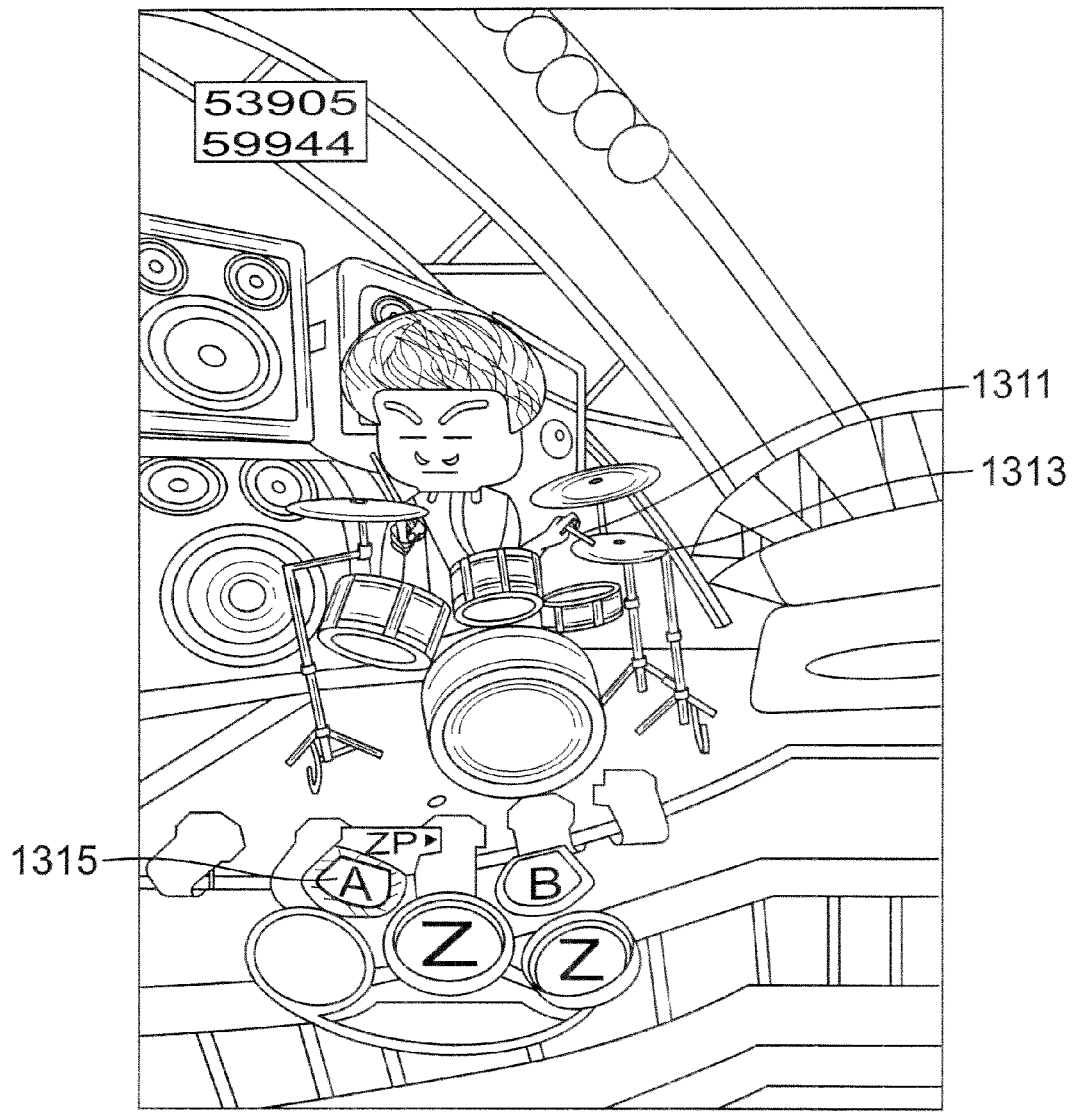
FIG. 13 is an example partial screenshot of the further video user interface of FIG. 12 showing the drummer striking a drum of the drum set.

FIG. 13 shows the display of FIG. 12, but with the drummer striking a drum head 1313, or more particularly a cymbal, with a drum stick 1311. Generally, a processor executing video game instructions commands a display of the drummer striking a drum head responsive to input signals from a controller indicating a strike of the particular drum head. In addition, an icon indicative of the drum struck is also displayed in a manner indicating a drum head strike, with the icon displayed with greater lighting in FIG. 13 than in FIG. 12.

As shown in FIGS. 12 and 13, the drum head struck is to the drummers left hand side, which is displayed on the right of the drummer as the front of the drummer is displayed. Conversely, the icon representative of the struck drum head is shown on the left side of the icons representative of the drum heads. Accordingly, the icons are shown as being in front of and facing a user viewing the display, and the drum set is shown in front of and facing the displayed drummer. In various embodiments the drummer may instead be displayed in a manner mimicking a mirror image of a user viewing the display.

Aspects of the invention therefore provides for mapping, and subsequent generation, of audio and video output signals to various input signal combinations on a video game controller for a video game, for example, a music rhythm video game. Although the invention has been described with respect to certain embodiments, it should be recognized that the invention may be practiced other than as specifically described, the invention comprising the claims and their insubstantial variations supported by this disclosure.

What is claimed is:

1. A method of providing audio and video outputs for a video game, comprising:
   receiving an input signal from a video game controller, the input signal being based on an output of an accelerometer of the video game controller;
   receiving additional signals from a plurality of additional inputs on the video game controller, the additional signals being based on status of a plurality of buttons of the video game controller, at least one combination of the additional inputs being associated with a predefined sequence of successive audio outputs;
   selecting one or more audio outputs to output based on the input signal and the additional signals, the one or more audio outputs including the predefined sequence of successive audio outputs; and
   determining a video output based on the selection of the one or more audio outputs.

2. The method of claim 1, wherein the selected one or more audio outputs is selected from a lookup table mapping the input signal and the additional signals to audio outputs, at least a portion of the audio outputs comprising the predefined sequence of successive audio outputs.

3. The method of claim 1, wherein the predefined sequence of successive audio outputs corresponds to a fill sequence of a drum set.

4. The method of claim 3, wherein at least a portion of the one or more audio outputs is mapped to an icon on a visual display.

5. The method of claim 4, wherein the video output is a modification of the icon mapped to the selected audio output.

* * * * *

UNITED STATES PATENT AND TRADEMARK OFFICE
CERTIFICATE OF CORRECTION

PATENT NO.        : 8,858,330 B2
APPLICATION NO.   : 12/172932
DATED             : October 14, 2014
INVENTOR(S)       : Jesse B. Raymond and Muhammad A. Ahmed Page 1 of 1

It is certified that error appears in the above-identified patent and that said Letters Patent is hereby corrected as shown below:

In the Specification

In column 2, line 62, delete "screen shot" and insert --screenshot--, therefor.

In column 7, line 24, delete "torn" and insert --tom--, therefor.

In column 8, line 35, delete "drum," and insert --drum--, therefor.

In column 11, line 22, delete "torn" and insert --tom--, therefor.

Signed and Sealed this
Twenty-sixth Day of May, 2015

Michelle K. Lee
*Director of the United States Patent and Trademark Office*